United States Patent [19]
Yokota et al.

[11] 3,991,802
[45] Nov. 16, 1976

[54] STUDDED TIRE

[75] Inventors: Yasushi Yokota, Kodaira; Hisao Tsuji, Akigawa, both of Japan

[73] Assignee: Bridgestone Tire Company Limited, Tokyo, Japan

[22] Filed: Oct. 24, 1974

[21] Appl. No.: 517,729

[30] Foreign Application Priority Data
Oct. 25, 1973 Japan.............................. 48-119400

[52] U.S. Cl................................ 152/210; 152/167
[51] Int. Cl.².......................................... B60C 11/16
[58] Field of Search.... 152/167, 168, 208, 210–212, 152/209 R

[56] References Cited
UNITED STATES PATENTS

| 2,627,888 | 2/1953 | Bull..................................... 152/210 |
|---|---|---|
| 2,652,876 | 9/1953 | Eisner................................. 152/210 |
| 3,272,252 | 9/1966 | Nordquist........................... 152/211 |
| 3,407,860 | 10/1968 | Mossberg............................ 152/210 |
| 3,566,948 | 3/1971 | Menell et al........................ 152/210 |
| 3,675,700 | 7/1972 | Verdier............................... 152/210 |

Primary Examiner—Drayton E. Hoffman
Attorney, Agent, or Firm—Sughrue, Rothwell, Mion, Zinn & Macpeak

[57] ABSTRACT

A studded tire having excellent performance on ice and snow is formed by striking a plurality of pin type spikes into the tire at a region of 40 to 80% of the distance from circumferential center of tread to shoulder.

2 Claims, 2 Drawing Figures

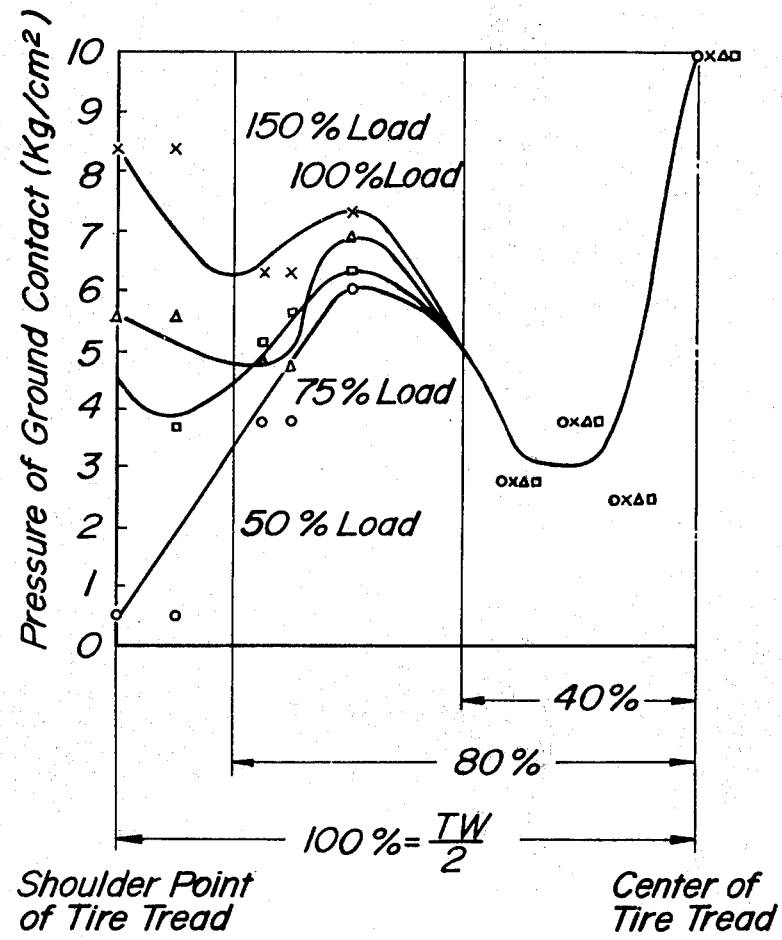
FIG_1

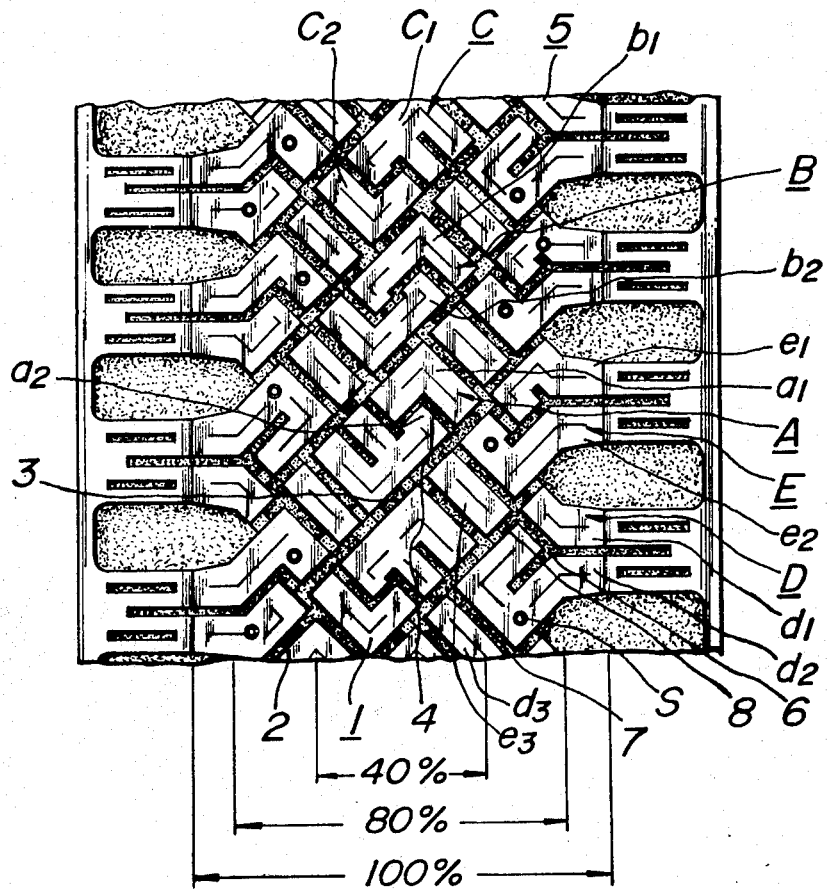

STUDDED TIRE

BACKGROUND OF THE INVENTION

1. Field of the Invention

The present invention relates to pneumatic tires and more particularly to studded tires wherein a plurality of anti-skidding spikes are struck into a tread surface of the tire.

2. Prior Art

As is well-known, spikes for tires are of tubular type and pin type, which are distinguished in accordance with the shape of a chip provided on a shank and consisting mostly of super hard alloy as follows: the former type is hollow tubular and the latter type is non-hollow cylindrical.

The performances of both spikes as described above were compared by mounting tires having a size 6.00-13-6PR on a vehicle having a gross vehicle weight of 1,200 Kg and testing them on frozen road to obtain results as shown in the following Table 1.

Table 1

|  | Stopping distance (m) | | Tractive force (Kg) | |
| --- | --- | --- | --- | --- |
|  | 30 Km/h | 40 Km/h | at static state | at spinning |
| Tubular type | 9.9 | 16.6 | 263 | 105 |
| Pin type | 13.0 | 26.9 | 210 | 80 |

As seen from Table 1, the tubular type spike is generally superior in performance to the pin type spike. This is due to the difference of edge length scratching the frozen surface between the spikes.

However, studded tires do not necessarily run only on a frozen road, but frequently run on non-frozen and non-snowed roads. In the latter case, the road surface is damaged by the spikes in the tire.

Of course, this degree of damage is more severe in the use of tubular type spike having improved performances on a frozen road than the use of pin type spike. Therefore, some western countries prohibit the use of spikes for tires.

Furthermore, in high-speed running (the running speed on paved road is as high as 80 to 110 Km/h although the speed on snowed and frozen roads is at most 30 to 40 Km/h), the tubular type spike is apt to cause tottering thereof prior to generation of heat and falling off of these spikes as compared with the pin type spikes is greater. Accordingly, the use of pin type spikes is particularly useful for all-weather type tires requiring high-speed durability and high-speed safety.

SUMMARY OF THE INVENTION

An object of the present invention is therefore to solve the above described problems in the prior art and to improve performances on ice (braking property, tractive force, cornering characteristics and the like) of the studded tire utilizing the merits of pin type spike such that the generation of heat is small even if running on a common paved road, tottering and falling off of spikes are less for a long time of running, and damage to the road surface is small.

In the conventional studded tires, it is a common practice to strike most of the spikes into positions near to a shoulder of the tire, which is generally believed to have a relatively high pressure of ground contact, and slightly inside from the edge of the shoulder so as not to cause falling off of spikes. For instance, when four rows of spikes are laterally struck into the tire, at least two rows of spikes have been struck into the tire at positions corresponding to 80–90% distance from the center of the tread to the shoulder.

The inventors have studied such a striking position and observed the actual number of riding persons in running passenger cars (commercial, private and the like) at several snowed sections in Japan (Hokkaido, Tohoku districts, Hokuriku districts) to determine the mean load factor per tire.

As the result, it has been found that in many cases the load factor of the tire for passenger cars is used within a range of from 50% to 75% based on 100% load according to JIS-4202 corresponding to TRA standard.

Further, a static load test was carried out with respect to tires of several sizes for a typical passenger car having a different structure and material to determine the pressure distribution of ground contact, and as a result a second important conclusion was reached that the common bias tires excluding a special structure such as so-called radial tire exhibit the substantially same tendency of pressure distribution of ground contact independent of the material and structure and the pressure distribution largely varies with load. Particularly, the pressure distribution of ground contact clearly exhibits a different condition under 100% or more load and 50–75% load.

BRIEF DESCRIPTION OF THE DRAWINGS

The invention will now be described in greater detail with reference to the accompanying drawings, wherein:

FIG. 1 is a diagram showing a pressure distribution of ground contact in a bias tire under various loads; and FIG. 2 is a partial plan view of an embodiment of the studded tire according to the present invention.

DESCRIPTION OF THE PREFERRED EMBODIMENT

The change of pressure distribution of ground contact is shown as a function of load in FIG. 1 with respect to a bias tire of type B78-13-4PR(2P). In this figure, the ordinate shows the pressure of ground contact and the abscissa shows a position in transverse section of the tire from the shoulder to the center of the tread.

As seen from FIG. 1, the striking position of the spikes in the prior art, that is, the position near to the shoulder having a relatively high pressure of ground contact is really applied under only an approximately 100% or more load, so that it cannot be said that in the usual running under 50–70% load the position near to the shoulder has a high pressure of ground contact.

Therefore, the conventional spike arrangement wherein two rows of spikes are struck into the tire at positions corresponding to 80–90% distance from the center of the tread is an efficiently undesirable means.

The present invention is based on the above mentioned knowledge and provides a studded tire comprising a tread provided with a shoulder at each side, biased carcass plies and pin type spikes provided on the surface of said tread near to said shoulder, said spikes being struck in at least one row at a region of 40 to at most 50% of the distance from the circumferential center of the tread to the shoulder, in at least one row at a region of 50 to at most 60% of said distance, and in at least one row at a region of 60 to at most 80% of said distance, respectively. According to the present invention, the striking range of the pin type spikes extends to 40–80% of the tread width. Particularly, the pin type spikes are mainly arranged at the region of 40–60% of the distance from the circumferential center of the tread and further at the region of 60–80% of the distance considering from the fact that the pressure of ground contact distributes at a high level near to the region of 80% of the distance with the increase of load, whereby the anti-skidding efficiency is improved and the difference of performances on ice between the tubular type and pin type spikes is sufficiently compensated for.

Moreover, FIG. 1 does show the pressure distribution of ground contact under static vertical load and hence corresponds to the behavior of the tire in the common straight running of the vehicle. Therefore, the behavior in the curved running or cornering operation must be considered separately. However, the operation of cornering on frozen road at a high speed and small turning is very dangerous and is generally prohibited. In fact, the cornering operation is conducted at a relatively large turning radius or at a low speed. Under such circumstances, the load is not unevenly distributed only in the shoulder. Thus, the striking position of the pin type spike according to the present invention is able to serve as an improved anti-skidding means in the actual cornering operation.

In this way, satisfactory performance on ice of the studded tire itself are obtained even if the pin type spike is used as the spike.

Furthermore, the inventors have made investigations with respect to the improvement of performance on snow and wear resistance of the shoulder in studded tires.

In snow tires or studded tires, it is well-known that a block pattern is superior to a rib pattern in the performance of the tire.

The inventors have experimented on the tire pattern in order to improve performance on snow of the tire and found the following important feature. That is, the main pattern of the tire consists of (A) a center block line located at the center of the tire tread, (B) relatively wide zig-zag type main grooves adjacent to and outside the center block line, and (C) shoulder block lines existent outside the main grooves. In this case, each of the center block line and the shoulder block line is formed by successively arranging unit blocks in the circumferential direction. Each unit block consists of two or several sub-blocks divided by means of relatively narrow branch channels. Furthermore, one or two pin type spikes are struck into the shoulder block line at a position corresponding to 45–75% of the distance from the center of the tread to the shoulder and particularly apart from the center of the each unit block.

The branch channel to be effective is located at the center of the unit block, because there is an edge effect of tire pattern as a design factor for providing anti-skidding effect on snow and the performance on snow is deteriorated as the length of the edge decreases. Therefore, if the spikes are arranged on the branch channel, the edge effect is not only obstructed, but also the sub-blocks are fastened to each other by the spikes although the unit block is divided into sub-blocks, so that the rigidity of the shoulder block is higher than that of the center block, and consequently the wear resistance of the shoulder is deteriorated. Accordingly, it is necessary to avoid the striking of spikes into the branch channel.

The invention will be explained in detail with reference to the following example.

FIG. 2 shows a preferred embodiment of tread pattern in the studded tire according to the present invention. A center block line 1 consists of a combination of rectangular unit blocks A, B and C in which these unit blocks are surrounded with inclined zig-zag type main grooves 2 and sub-grooves 3 communicating with said main grooves and arranged in the order of A, B, C, A, B, C ... in the circumferential direction. The unit block A is divided into sub-blocks $a_1$ and $a_2$ by a stepped branch channel 4, the unit block B is divided into sub-blocks $b_1$ and $b_2$ by a stepped branch channel 4, and the unit block C is divided into sub-blocks $c_1$ and $c_2$ by a stepped branch channel 4.

The sub-blocks $a_1$ and $c_2$ have the same V-shape, the sub-blocks $a_2$ and $c_1$ have the same inclined F-shape, and the sub-blocks $b_1$ and $b_2$ have the same unequal shape. Furthermore, the relations between the unit blocks A and C, the sub-blocks $a_1$ and $c_2$, and the sub-blocks $a_2$ and $c_1$, and the sub-blocks $b_1$ and $b_2$ are point symmetry, respectively.

A shoulder block line 5 consists of a combination of unit blocks D and E having a gunstock shape as a whole, in which the unit blocks D and E are arranged in the order of DE, ED, DE, ... through the main grooves 2 on either side of the center block line 1. The unit blocks D and E are divided into sub-blocks $d_1, d_2, d_3$ and $e_1, e_2, e_3$ by branch channels 6 and 7, respectively. In the shoulder block line 5, the unit blocks D and E are mutually separated by sub-grooves 8 communicating with the main grooves 2.

The pin type spikes S are struck into the struck into the shoulder block line 5 at a first region corresponding to 49% of the distance from the center of the tread to the shoulder, a second region corresponding to 53% of said distance, a third region corresponding to 56% of said distance, and a fourth region corresponding to 73% of said distance every three unit blocks and apart from the center of each block, respectively.

The studded tire shown in FIG. 2 has a size of 6.00–13 and comprises a carcass having a 2 ply bias structure of 1,260 denier/two-twisted nylon cord (cord angle: 36° with respect to the central plane) and a breaker consisting of 1 ply of 840 denier/two-twisted nylon cord (cord angle: 39° with respect to the central plane).

Then, the test tire P having the arrangement of the pin type spike S according to the present invention was provided together with the comparative tires A, B and C having the arrangement of the conventional tubular type spikes as shown in the following Table 2.

Table 2

|  | Striking position of spikes in the distance from center of tread to shoulder (%) spikes | Total number of struck Total number | Number of struck spikes in 40–75% distance |
|---|---|---|---|
| Test tire P | 73 | One row 24 |  |
|  | 56 | " |  |
|  | 53 | " | 96/96 = 100% |
|  | 49 | " |  |
|  | 82 | One row 32 |  |
| A | 69 | " | 64/96 = 67% |

Table 2-continued

| | | Striking position of spikes in the distance from center of tread to shoulder (%) spikes | Total number of struck Total number | Number of struck spikes in 40-75% distance |
|---|---|---|---|---|
| | | 42 | " | |
| | | 82 | One row 24 | |
| Comparative tires | B | 77 | " | |
| | | 70 | " | 48/96 = 50% |
| | | 50 | " | |
| | | 82 | One row 32 | |
| | C | 77 | " | 32/96 = 33% |
| | | 70 | | |

Each studded tire was tested on ice using the actual passenger car. As the test conditions, the inner pressure in tire was 1.7 Kg/cm² and the load was 280 Kg (JIS 75%).

The test results are shown in the following Table 3.

Table 3

| | Tractive force | | Stopping |
|---|---|---|---|
| | at static state | at spinning | distance (at 40 Km/h) |
| P | 144(171 Kg) | 137 (51 Kg) | 119 (28 m) |
| A | 129(153 Kg) | 122 (45 Kg) | 104 (32.2 m) |
| B | 100(119 Kg) | 100 (37 Kg) | 100 (33.5 m) |

Table 3-continued

| | Tractive force | | Stopping |
|---|---|---|---|
| | at static state | at spinning | distance (at 40 Km/h) |
| C | 76(91 Kg) | 92 (34 Kg) | 76 (44 m) |

Note:
In the table, the non-unit numeral indiates an index based on 100 of the tire B and the numeral in the bracket indicates an absolute value.

According to the present invention, the same performance on ice as in the case of using the tubular type spike can effectively be obtained when the pin type spikes are used. Furthermore, the considerable damage or road surface and the falling off of spikes which has neven been prevented in case of the tubular type spike can advantageously be prevented.

What is claimed is:

1. In a studded tire having a tread provided with a shoulder at each side, biased carcass plies and pin type spikes provided on the surface of said tread near to said shoulder, the improvement comprising said spikes being struck in at least a first row in the range of 40 to 50% of the distance from the circumferential center of the tread to the shoulder, in at least a second row in the range of 50 to 60% of said distance, and in at least a third row in the range of 60 to 80% of said distance, respectively.

2. In a studded tire as claimed in claim 1 wherein said pin type spikes are struck in a first row corresponding to 49% of the distance from the circumferential center of the tread to the shoulder, in a second row corresponding to 53% of said distance, in a third row corresponding to 56% of said distance, and in a fourth row corresponding to 73% of said distance, respectively.

\* \* \* \* \*